US011726468B1

(12) United States Patent
Cooperman

(10) Patent No.: US 11,726,468 B1
(45) Date of Patent: Aug. 15, 2023

(54) FULLY AUTOMATED ANOMALY DETECTION SYSTEM AND METHOD

(71) Applicant: IX-DEN LTD., Ramat Gan (IL)

(72) Inventor: Leonid Cooperman, Rishon LeZion (IL)

(73) Assignee: IX-DEN LTD., Ramat Gan (IL)

( * ) Notice: Subject to any disclaimer, the term of this patent is extended or adjusted under 35 U.S.C. 154(b) by 0 days.

(21) Appl. No.: 18/156,411

(22) Filed: Jan. 19, 2023

(51) Int. Cl.
G05B 23/02 (2006.01)

(52) U.S. Cl.
CPC ..... G05B 23/0254 (2013.01); G05B 23/0281 (2013.01)

(58) Field of Classification Search
CPC .......... G05B 23/0254; G05B 23/0281
USPC .......... 702/183
See application file for complete search history.

(56) References Cited

U.S. PATENT DOCUMENTS

| | | | |
|---|---|---|---|
| 10,956,808 | B1 | 3/2021 | Bhardwaj et al. |
| 2016/0330225 | A1 | 11/2016 | Kroyzer et al. |
| 2017/0228278 | A1 | 8/2017 | Pallath et al. |
| 2017/0249564 | A1 | 8/2017 | Garvey et al. |
| 2019/0014137 | A1 | 1/2019 | Du et al. |
| 2021/0105293 | A1* | 4/2021 | Zaron ............ H04L 67/1095 |
| 2021/0306356 | A1 | 9/2021 | Pi et al. |
| 2022/0191227 | A1* | 6/2022 | Pfleger de Aguiar .............. H04L 63/1408 |

FOREIGN PATENT DOCUMENTS

| | | | |
|---|---|---|---|
| DE | 102018221684 A1 | 6/2020 | |
| WO | WO-2022057260 A1 * | 3/2022 | ......... G05B 23/0275 |

OTHER PUBLICATIONS

Albattah et al. (2022)—A Correlation-Based Anomaly Detection Model for Wireless Body Area Networks Using Convolutional Long Short-Term Memory Neural Network; Specifically look at: pp. 11-13.
Usama et al. (2017)—Unsupervised Machine Learning for Networking: Techniques, Applications and Research Challenge; Specifically look at: Tables V, VII and VIII.

* cited by examiner

*Primary Examiner* — John H Le

(57) ABSTRACT

A system and method for automatically detecting anomalies in an industrial control system (ICS) is provided. A behavioral model is provided, the model comprising groups of learned sets of interdependent ICS signals of parameters associated with an operation of the ICS. For each of the groups, the learned sets in the respective group include at least one independent signal and one or more dependent signals that are dependent on the independent signal in accordance with a common type of dependency. Monitoring signals of given parameters are obtained, the monitoring signals corresponding to a given learned set of the learned sets in one of the groups. Upon determining a nonconformance of an observed interdependency of the monitoring signals with a predicted interdependency of the monitoring signals, the predicted interdependency being in accordance with the type of dependency associated with the given learned set, an anomaly is automatically detected.

17 Claims, 4 Drawing Sheets

FULLY AUTOMATED ANOMALY DETECTION SYSTEM AND METHOD

TECHNICAL FIELD

The invention relates to a fully automated anomaly detection system and method.

BACKGROUND

An Industrial Control System (ICS) is usually monitored and managed by Industrial Controllers, each of which receives sensor data from a large number of sensors connected to the ICS and controls some actuators connected to the ICS. Current management systems (e.g., Supervisory control and data acquisition (SCADA) systems) are capable of detecting anomalies in the sensor data. However, such management systems are capable of monitoring only a small percentage of the sensor data, and, as such, are incapable of detecting much of the anomalous behavior of the sensor data that is received by the Industrial Controllers. Moreover, the sensor data that is monitored by current management systems is not directly monitored (the raw sensor data is not monitored). Rather, the monitored sensor data is processed, using Digital Signal Processing (DSP) techniques, and is digitally filtered (using, for example, Kalman filters, bandpass filters, etc.). As a result, dependencies and correlations between signals of the raw sensor data are not captured, which also may result in the failure to detect certain anomalies in the monitored sensor data.

Thus, there is a need in the art for a fully automated anomaly detection system and method for automatically and more comprehensively detecting anomalies in the sensor data collected by the ICS.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2021/0306356 ("Pi et al."), published on Sep. 30, 2021, discloses a system for monitoring an industrial system for cyberattacks, and includes an industrial control system. The industrial control system includes a plurality of actuators, a plurality of sensors, each arranged to measure one of a plurality of operating parameters, an edge device and a computer including a data storage device. The data storage device has stored thereon a program that includes each of a time-series database including expected operating ranges for each operating parameter, a clustering-based database that includes clusters of operating parameters having similarities, and a correlation database that includes pairs of operating parameters that show a correlation. An alarm system is operable to initiate an alarm in response to current operating data including a measurement from one of the plurality of sensors falling outside of an expected range, a change in the expected clustering of one of the plurality of sensors based on the current operating data from each of the plurality of sensors, and a variation in the current operating data between two of the plurality of sensors that falls outside of an expected correlation of the two of the plurality of sensors.

German Patent Application Publication No. 102018221684A1 ("Hanselmann et al."), published on Jun. 18, 2020, discloses a computer-implemented method for anomaly detection, in particular in a communication network. A first time series is determined for a first signal, which is defined by a chronological sequence of first signal values of the first signal. A second time series is determined for a second signal. There is defined the temporal sequence of second signal values of the second signal, and a model for a signal behavior in the communication network characterizing, in particular, linear correlation between the first signal and the second signal and a temporal course of the first signal and the second signal, depending on the model. At least one prediction value is determined depending on the first time series and depending on the second time series. A measure for an anomaly detection is determined depending on the at least one prediction value and at least one of the signal values. An anomaly is detected when the measure exceeds a threshold.

U.S. Patent Application Publication No. 2016/0330225 ("Kroyzer et al."), published on Nov. 10, 2016, discloses a method of detecting anomalies in an industrial control system. The method includes analyzing data of correct operational parameters from at least one input device and storing the correct operational parameter or a correlation of at least two operational parameters as training data. The training data is used to train an anomaly detection system. Current operational parameters of the at least one input device are detected. The anomaly detection system then checks at least one of the detected operational parameter or a correlation of at least two detected operational parameters to detect a deviation from the training data. When the detected deviation is above or below a defined threshold, a communication function is performed. For example, the communication function is at least one of creating an alarm, communicating data to at least one of a control system and an operator, and recording the data or the alarm.

Albattah et al., "A Correlation-Based Anomaly Detection Model for Wireless Body Area Networks Using Convolutional Long Short-Term Memory Neural Network," Sensors 2022, 22, 1951, published on Mar. 2, 2022, proposes a model that employs the correlations that exist in different physiological data attributes with the ability of hybrid Convolutional Long Short-Term Memory (ConvLSTM) techniques to detect both simple point anomalies as well as contextual anomalies in a big data stream of a Wireless Body Area Network (WBAN).

U.S. Patent Application Publication No. 2017/0228278 ("Pallath et al."), published on Aug. 10, 2017, describes methods, systems, and computer program products for detecting anomalies in an Internet-of-Things (IoT) network. One computer-implemented method includes receiving, by operation of a computer system, a dataset of a plurality of data records, each of the plurality of data records comprising a plurality of features and a target variable, the plurality of features and target variable including information of a manufacturing environment; identifying a set of normal data records from the dataset based on the target variable; identifying inter-feature correlations by performing correlation analysis on the set of normal data records; and detecting an anomaly based on the inter-feature correlations for predictive maintenance.

U.S. Patent Application Publication No. 2017/0249564 ("Garvey et al."), published on Aug. 31, 2017, describes techniques for automatically detecting and accommodating state changes in a computer-generated forecast. In one or more embodiments, a representation of a time-series signal is generated within volatile and/or non-volatile storage of a computing device. The representation may be generated in such a way as to approximate the behavior of the time-series signal across one or more seasonal periods. Once generated, a set of one or more state changes within the representation of the time-series signal is identified. Based at least in part on at least one state change in the set of one or more state changes, a subset of values from the sequence of values is selected to train a model. An analytical output is then generated, within volatile and/or non-volatile storage of the computing device, using the trained model.

U.S. Patent Application Publication No. 2019/0014137 ("Du et al."), published on Jan. 10, 2019, discloses techniques for providing Internet of Things (IoT) device security. An applicable system includes IoT devices coupled to an evolving context-aware IoT device security system. In a specific implementation, the system uses common factor aggregation of event parameters to determine IoT device personality.

Usama et al., "Unsupervised Machine Learning for Networking: Techniques, Applications and Research Challenges," arXiv:1709.06599v1 [cs.NI], published on Sep. 19, 2017, provides an overview of applications of unsupervised learning in the domain of networking.

U.S. Pat. No. 10,956,808 ("Bhardwaj et al."), published on Mar. 23, 2021, discloses a system and method for deep learning unsupervised anomaly detection in Internet of Things (IoT) sensor networks or manufacturing execution systems. The system and method use an ensemble of a plurality of generative adversarial networks for anomaly detection.

General Description

In accordance with a first aspect of the presently disclosed subject matter, there is provided a system for automatically detecting anomalies in an industrial control system (ICS), the system comprising a processing circuitry configured to: provide a behavioral model comprising interdependency-based groups of learned sets of interdependent ICS signals of parameters associated with an operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group, the given type being different for at least two of the interdependency-based groups; obtain monitoring ICS signals of given parameters of the parameters, the monitoring ICS signals corresponding to a given learned set of the learned sets in a given interdependency-based group of the interdependency-based groups; monitor a conformance of an observed interdependency of the monitoring ICS signals with a predicted interdependency of the monitoring ICS signals, the predicted interdependency being in accordance with the given type of dependency associated with the given learned set; and upon determining a nonconformance of the observed interdependency with the predicted interdependency, automatically detect an anomaly.

In some cases, at least one of the monitoring ICS signals is sensed by a sensor in the ICS.

In some cases, at least one of the monitoring ICS signals is derived from a monitoring sensed signal that is sensed by a sensor in the ICS.

In some cases, upon a repeated nonconformance of the observed interdependency with the predicted interdependency, in accordance with an interdependency invalidity criterion, the processing circuitry is further configured to: automatically update the behavioral model.

In some cases, the behavioral model further comprises one or more behavior-based groups of respective ICS signals of the parameters that are associated with the operation of the ICS, wherein, for each of the behavior-based groups, the respective ICS signals in the respective behavior-based group exhibit a common statistical behavior; and the processing circuitry is further configured to: obtain a second monitoring ICS signal corresponding to a respective ICS signal of the respective ICS signals in a given behavior-based group of the behavior-based groups; monitor a conformance of an observed statistical behavior of the second monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detect a second anomaly.

In some cases, the second monitoring ICS signal is sensed by a sensor in the ICS.

In some cases, the second monitoring ICS signal is derived from a monitoring sensed signal that is sensed by a sensor in the ICS.

In some cases, upon a repeated nonconformance of the observed statistical behavior with the predicted statistical behavior, in accordance with a statistical behavior invalidity criterion, the processing circuitry is further configured to: automatically update the behavioral model.

In accordance with a second aspect of the presently disclosed subject matter, there is provided a method for automatically detecting anomalies in an industrial control system (ICS), the method being performed by a processing circuitry, and comprising: providing a behavioral model comprising interdependency-based groups of learned sets of interdependent ICS signals of parameters associated with an operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group, the given type being different for at least two of the interdependency-based groups; obtaining monitoring ICS signals of given parameters of the parameters, the monitoring ICS signals corresponding to a given learned set of the learned sets in a given interdependency-based group of the interdependency-based groups; monitoring a conformance of an observed interdependency of the monitoring ICS signals with a predicted interdependency of the monitoring ICS signals, the predicted interdependency being in accordance with the given type of dependency associated with the given learned set; and upon determining a nonconformance of the observed interdependency with the predicted interdependency, automatically detecting an anomaly.

In some cases, at least one of the monitoring ICS signals is sensed by a sensor in the ICS.

In some cases, at least one of the monitoring ICS signals is derived from a monitoring sensed signal that is sensed by a sensor in the ICS.

In some cases, upon a repeated nonconformance of the observed interdependency with the predicted interdependency, in accordance with an interdependency invalidity criterion, the method further comprises: automatically updating the behavioral model.

In some cases, the behavioral model further comprises one or more behavior-based groups of respective ICS signals of the parameters that are associated with the operation of the ICS, wherein, for each of the behavior-based groups, the respective ICS signals in the respective behavior-based group exhibit a common statistical behavior; and the method further comprises: obtaining a second monitoring ICS signal corresponding to a respective ICS signal of the respective ICS signals in a given behavior-based group of the behavior-based groups; monitoring a conformance of an observed statistical behavior of the second monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detecting a second anomaly.

In some cases, the second monitoring ICS signal is sensed by a sensor in the ICS.

In some cases, the second monitoring ICS signal is derived from a monitoring sensed signal that is sensed by a sensor in the ICS.

In some cases, upon a repeated nonconformance of the observed statistical behavior with the predicted statistical behavior, in accordance with a statistical behavior invalidity criterion, the method further comprises: automatically updating the behavioral model.

In accordance with a third aspect of the presently disclosed subject matter, there is provided a non-transitory computer readable storage medium having computer readable program code embodied therewith, the computer readable program code, executable by a processing circuitry of a computer to perform a method for automatically detecting anomalies in an industrial control system (ICS), the method comprising: providing a behavioral model comprising interdependency-based groups of learned sets of interdependent ICS signals of parameters associated with an operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group, the given type being different for at least two of the interdependency-based groups; obtaining monitoring ICS signals of given parameters of the parameters, the monitoring ICS signals corresponding to a given learned set of the learned sets in a given interdependency-based group of the interdependency-based groups; monitoring a conformance of an observed interdependency of the monitoring ICS signals with a predicted interdependency of the monitoring ICS signals, the predicted interdependency being in accordance with the given type of dependency associated with the given learned set; and upon determining a nonconformance of the observed interdependency with the predicted interdependency, automatically detecting an anomaly.

In accordance with a fourth aspect of the presently disclosed subject matter, there is provided a system for automatically detecting anomalies in an industrial control system (ICS), the system comprising a processing circuitry configured to: provide a behavioral model comprising behavior-based groups of respective ICS signals of parameters that are associated with an operation of the ICS, wherein, for each of the behavior-based groups, the respective ICS signals in the respective behavior-based group exhibit a common statistical behavior, the common statistical behavior being different for at least two of the behavior-based groups; obtain a monitoring ICS signal corresponding to a respective ICS signal of the respective ICS signals in a given behavior-based group of the behavior-based groups; monitor a conformance of an observed statistical behavior of the monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detect an anomaly.

In some cases, the monitoring ICS signal is sensed by a sensor in the ICS.

In some cases, the monitoring ICS signal is derived from a monitoring sensed signal that is sensed by a sensor in the ICS.

In some cases, upon a repeated nonconformance of the observed statistical behavior with the predicted statistical behavior, in accordance with a statistical behavior invalidity criterion, the processing circuitry is further configured to: automatically update the behavioral model.

In some cases, the behavioral model further comprises one or more interdependency-based groups of learned sets of interdependent ICS signals of parameters associated with the operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group; and the processing circuitry is further configured to: obtain second monitoring ICS signals of given parameters of the parameters, the second monitoring ICS signals corresponding to a given learned set of the learned sets in a given interdependency-based group of the interdependency-based groups; monitor a conformance of an observed interdependency of the second monitoring ICS signals with a predicted interdependency of the second monitoring ICS signals, the predicted interdependency being in accordance with the given type of dependency associated with the given learned set; and upon determining a nonconformance of the observed interdependency with the predicted interdependency, automatically detect a second anomaly.

In some cases, at least one of the second monitoring ICS signals is sensed by a sensor in the ICS.

In some cases, at least one of the second monitoring ICS signals is derived from a monitoring sensed signal that is sensed by a sensor in the ICS.

In some cases, upon a repeated nonconformance of the observed interdependency with the predicted interdependency, in accordance with an interdependency invalidity criterion, the processing circuitry is further configured to: automatically update the behavioral model.

In accordance with a fifth aspect of the presently disclosed subject matter, there is provided a method for automatically detecting anomalies in an industrial control system (ICS), the method being performed by a processing circuitry, and comprising: providing a behavioral model comprising behavior-based groups of respective ICS signals of parameters that are associated with an operation of the ICS, wherein, for each of the behavior-based groups, the respective ICS signals in the respective behavior-based group exhibit a common statistical behavior, the common statistical behavior being different for at least two of the behavior-based groups; obtaining a monitoring ICS signal corresponding to a respective ICS signal of the respective ICS signals in a given behavior-based group of the behavior-based groups; monitoring a conformance of an observed statistical behavior of the monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detecting an anomaly.

In some cases, the monitoring ICS signal is sensed by a sensor in the ICS.

In some cases, the monitoring ICS signal is derived from a monitoring sensed signal that is sensed by a sensor in the ICS.

In some cases, upon a repeated nonconformance of the observed statistical behavior with the predicted statistical behavior, in accordance with a statistical behavior invalidity criterion, the method further comprises: automatically updating the behavioral model.

In some cases, the behavioral model further comprises one or more interdependency-based groups of learned sets of interdependent ICS signals of parameters associated with the operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group; and the method further comprises: obtaining second monitoring ICS signals of given parameters of the parameters, the second monitoring ICS signals corresponding to a given learned set of the learned sets in a given interdependency-based group of the interdependency-based groups; monitoring a conformance of an observed interdependency of the second monitoring ICS signals with a predicted interdependency of the second monitoring ICS signals, the predicted interdependency being in accordance with the given type of dependency associated with the given learned set; and upon determining a nonconformance of the observed interdependency with the predicted interdependency, automatically detecting a second anomaly.

In some cases, at least one of the second monitoring ICS signals is sensed by a sensor in the ICS.

In some cases, at least one of the second monitoring ICS signals is derived from a monitoring sensed signal that is sensed by a sensor in the ICS.

In some cases, upon a repeated nonconformance of the observed interdependency with the predicted interdependency, in accordance with an interdependency invalidity criterion, the method further comprises: automatically updating the behavioral model.

In accordance with a sixth aspect of the presently disclosed subject matter, there is provided a non-transitory computer readable storage medium having computer readable program code embodied therewith, the computer readable program code, executable by a processing circuitry of a computer to perform a method for automatically detecting anomalies in an industrial control system (ICS), the method comprising: providing a behavioral model comprising behavior-based groups of respective ICS signals of parameters that are associated with an operation of the ICS, wherein, for each of the behavior-based groups, the respective ICS signals in the respective behavior-based group exhibit a common statistical behavior, the common statistical behavior being different for at least two of the behavior-based groups; obtaining a monitoring ICS signal corresponding to a respective ICS signal of the respective ICS signals in a given behavior-based group of the behavior-based groups; monitoring a conformance of an observed statistical behavior of the monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detecting an anomaly.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
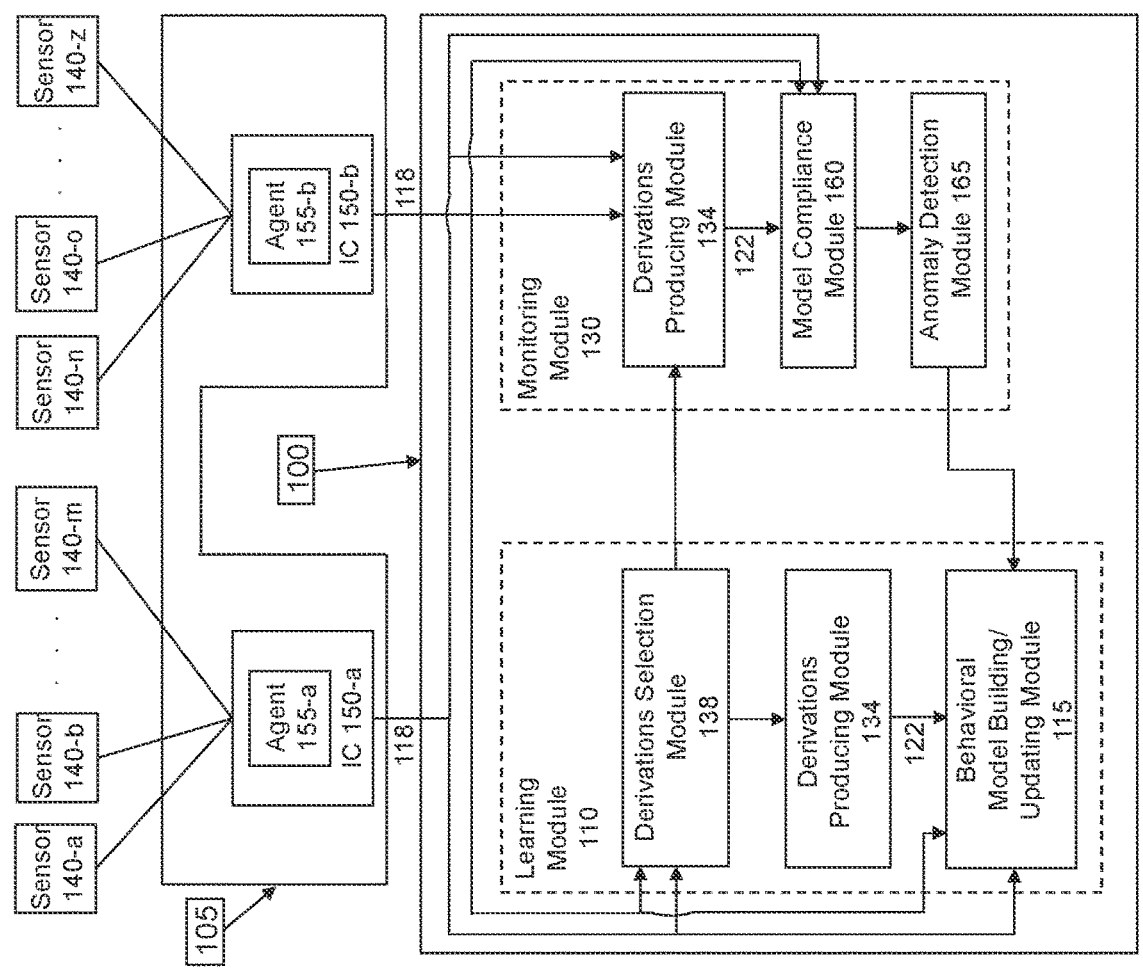
FIG. 1 is a block diagram schematically illustrating one example of an operation of an anomaly detection system for automatically detecting anomalies in an Industrial Control System (ICS), in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "monitoring", "obtaining", "determining", "detecting", "updating" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry", "controller" and "external computing entity" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "an additional example", "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
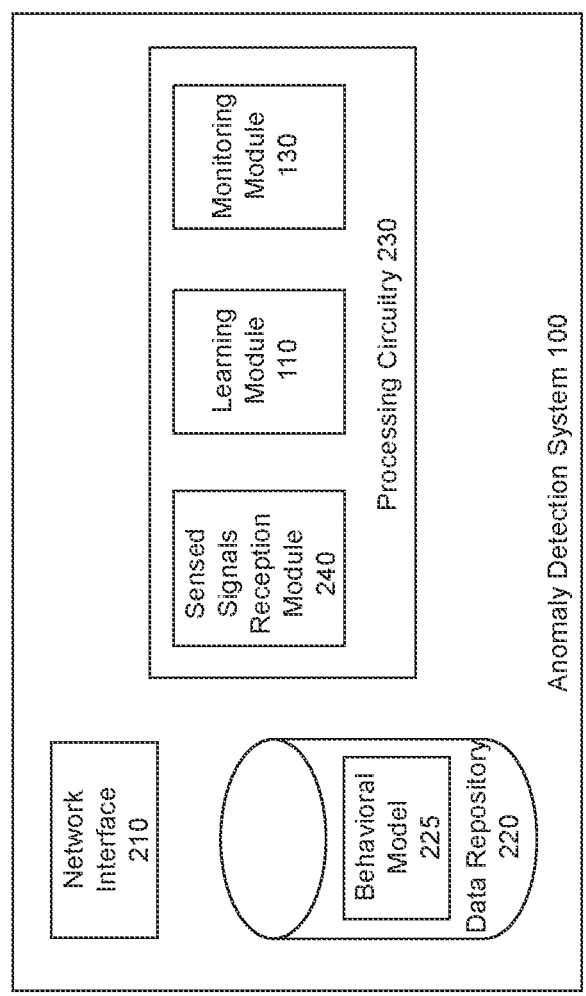
FIG. 2 is a block diagram schematically illustrating one example of an anomaly detection system, in accordance with the presently disclosed subject matter.
Figure 3:
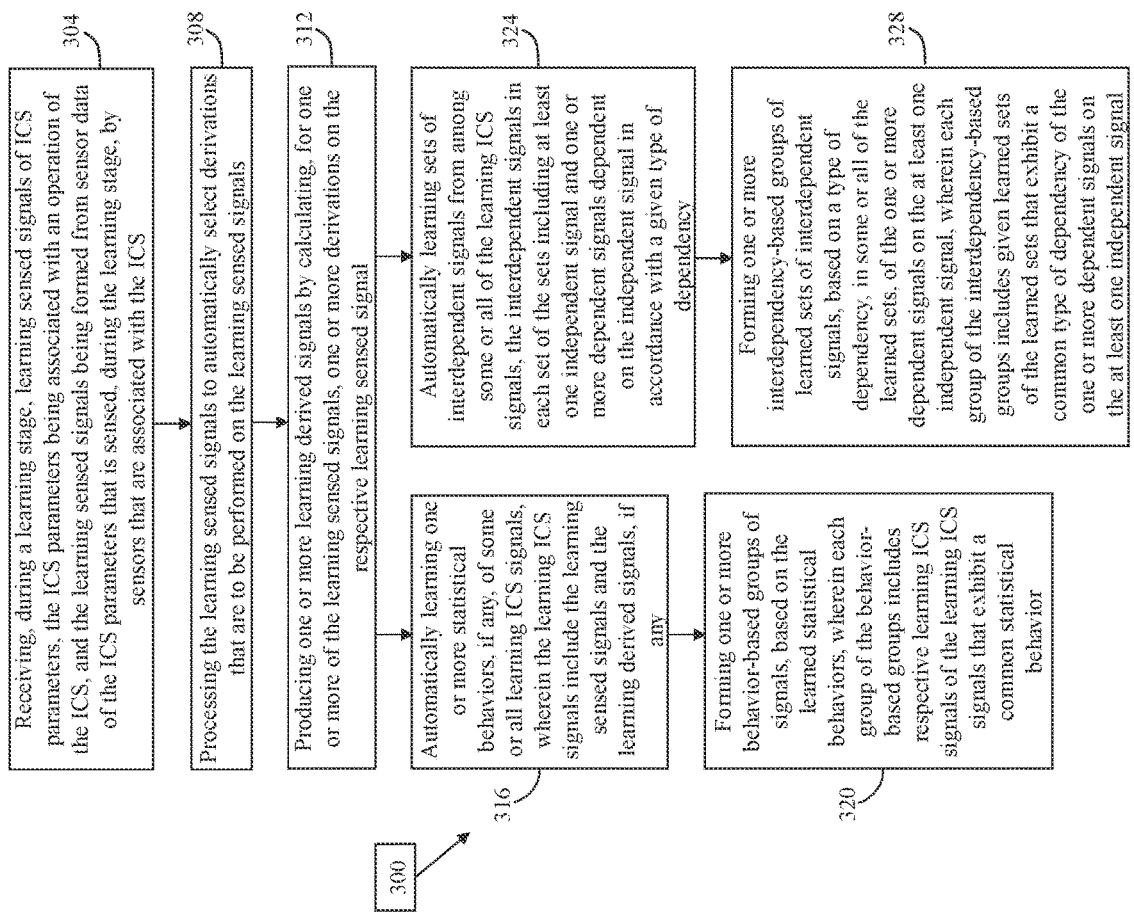
FIG. 3 is a flowchart illustrating one example of a sequence of operations for building a behavioral model, in accordance with the presently disclosed subject matter.
Figure 4:
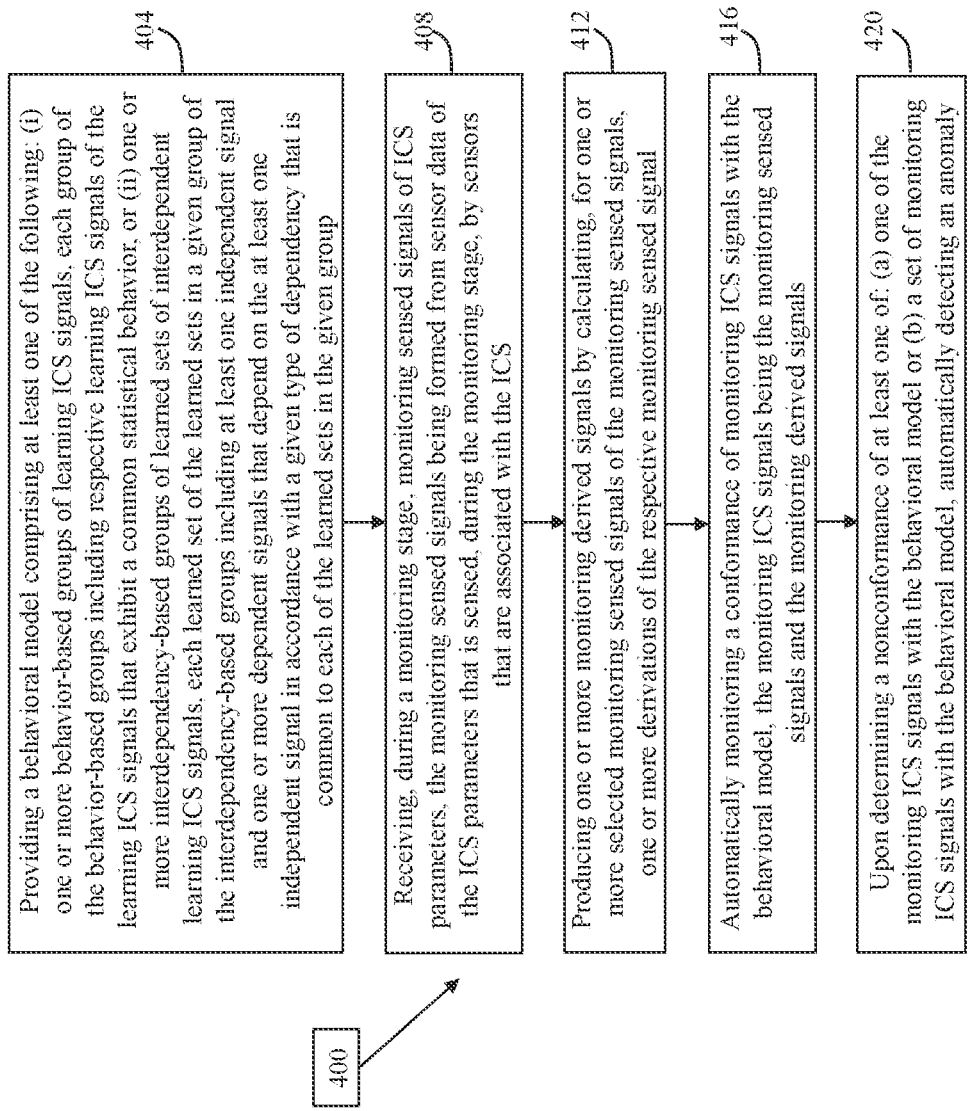
FIG. 4 is a flowchart illustrating one example of a sequence of operations for automatically detecting anomalies in an ICS, in accordance with the presently disclosed subject matter.

In embodiments of the presently disclosed subject matter, fewer, more and/or different stages than those shown in FIGS. 3 and 4 may be executed. In embodiments of the presently disclosed subject matter one or more stages illustrated in FIGS. 3 and 4 may be executed in a different order and/or one or more groups of stages may be executed simultaneously. FIGS. 1 and 2 illustrate a general schematic of the system architecture in accordance with embodiments of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a block diagram schematically illustrating one example of an operation of a fully automated anomaly detection system 100 for automatically detecting anomalies in an Industrial Control System (ICS) 105, in accordance with the presently disclosed subject matter.

In accordance with the presently disclosed subject matter, anomaly detection system 100 can be configured to perform a behavioral analysis of the ICS 105, based on a behavioral model of the ICS 105, to automatically detect, during a monitoring stage, an abnormal behavior of the ICS 105. The behavioral model can be built, e.g., using learning module 110, either by the anomaly detection system 100 or by an external computing entity (not shown), external to the anomaly detection system 100. The behavioral model is built, e.g., using behavioral model building/updating module 115 of a learning module 110, by analyzing, during a learning stage, learning ICS signals that are associated with ICS parameters, the ICS parameters being parameters associated with an operation of the ICS. The following are examples (non-limiting) of ICS parameters: time of work of a water pump; a water pool level; water consumption; power consumption of an AC (non-synchronous) electrical motor, a velocity (e.g., revolutions-per-minute) of an AC electrical motor, a temperature of an electrical motor, a load of an electrical transformer, an ambient (outside) temperature, a level of pollution, fuel consumption of an internal combustion engine, a fuel tank level of an internal combustion engine, etc. The learning ICS signals include learning sensed signals 118 of the ICS parameters, sensed during the learning stage, the learning sensed signals 118 being formed from sensor data of the ICS parameters, the sensor data being sensed by sensors (e.g., 140-*a*, 140-*b*, . . . , 140-*m*, 140-*n*, 140-*o*, . . . , 140-*z*) that are associated with the ICS 105. In some cases, the learning ICS signals further include one or more learning derived signals 122 that are associated with one or more selected ICS parameters of the ICS parameters, as detailed below.

Anomaly detection system 100 can be configured, during the monitoring stage, to analyze, e.g., using monitoring module 130, monitoring ICS signals that are associated with the ICS parameters. The monitoring ICS signals include monitoring sensed signals 118 of the ICS parameters, sensed during the monitoring stage, the monitoring sensed signals 118 being formed from sensor data of the ICS parameters, the sensor data being sensed by the sensors (e.g., 140-*a*, 140-*b*, . . . , 140-*m*, 140-*n*, 140-*o*, . . . , 140-*z*) that are associated with the ICS 105. In some cases, in which the learning ICS signals further include learning derived signals 122 of one or more selected ICS parameters of the ICS parameters, the monitoring ICS signals also include monitoring derived signals 122 of the selected ICS parameters, as detailed below.

During both the learning stage and the monitoring stage, some or all of the sensor data of the ICS parameters is sensed by sensors (e.g., 140-*a*, 140-*b*, . . . , 140-*m*, 140-*n*, 140-*o*, . . . , 140-*z*) that are connected to the ICS 105. In some cases, during both the learning stage and the monitoring stage, some of the sensor data is sensed by sensors that are external to the ICS 105, yet affect an operation of the ICS 105 (e.g., ambient (outside) temperature readings, readings of pollution levels, etc.).

Some or all of the sensor data is obtained by one or more industrial controllers (e.g., 150-*a*, 150-*b*) in the ICS 105 (in some cases, by an agent (e.g., 155-*a*, 155-*b*) on one of the industrial controllers) before being provided to the learning module 110 or the monitoring module 130. In FIG. 1, which illustrates a non-limiting example of an ICS 105, industrial controller 150-*a* obtains sensor data that is sensed by sensors 140-*a*, 140-*b*, . . . , 140-*m*, and industrial controller 150-*b* obtains sensor data that is sensed by sensors 140-*n*, 140-*o*, . . . , 140-*z*.

In some cases, as noted above, the learning ICS signals include one or more learning derived signals 122 that are associated with one or more selected parameters of the ICS parameters. The learning derived signals 122 are produced, e.g., using a derivations producing module 134, by calculating, for one or more learning sensed signals 118 of each of the selected parameters, one or more derivations of the respective learning sensed signal. Examples of derivations that can be performed on a respective learning sensed signal 118 include: calculating a first derivative of the respective learning sensed signal 118, calculating a second derivative of the respective learning sensed signal 118, calculating a moving average of the respective learning sensed signal 118, etc. In some cases, the derivations that can be potentially performed on a respective learning sensed signal 118 (but that are not necessarily performed on the respective learning sensed signal 118) are known to the system (i.e., anomaly detection system 100 or an external computing entity) that builds the behavioral model.

The number of sensors that are associated with the ICS 105 can be extremely large. For example, a regional water management system may have two million sensors connected thereto. Accordingly, it may be prohibitive from a processing resource standpoint to perform a maximum number of derivations on each of the learning sensed signals 118. Accordingly, in some cases, the learning sensed signals 118 on the basis of which learning derived signals 122 are to be produced and, optionally, the derivations that are to be performed on these learning sensed signals 118 are determined, e.g., by a derivations selection module 138 of the learning module 110 (which, as noted above, can be included in the anomaly detection system 100). In some cases, the derivations that are to be performed on learning sensed signals 118 are the most informative derivations.

The behavioral model is built, e.g., using behavioral model building/updating module 115, based on at least given learning ICS signals of the learning ICS signals, including, inter alia, learning sensed signals 118, and, if provided, learning derived signals 122. The behavioral model is built based on at least one of: (a) a statistical behavior of the given learning ICS signals or (b) interdependencies between at least some of the given learning ICS signals, as detailed further herein, inter alia with reference to FIG. 3.

Anomaly detection system 100 can be configured, during a monitoring stage, to perform, e.g., using a monitoring module 130, a behavioral analysis of an operation of the ICS 105, in accordance with the behavioral model. This is achieved by analyzing monitoring ICS signals that are associated with some or all of the ICS parameters. The monitoring ICS signals include monitored sensed signals 118 of ICS parameters, sensed during the monitoring stage, the monitored sensed signals 118 being formed from sensor data of the ICS parameters, the sensor data being sensed by sensors (e.g., 140-a, 140-b, . . . , 140-m, 140-n, 140-o, . . . , 140-z) that are associated with the ICS 105. In some cases, the monitoring ICS signals further include monitoring derived signals 122 of some or all of the ICS parameters that are monitored during the monitoring stage. The monitoring derived signals 122 are produced, e.g., using derivations producing module 134, by calculating, for one or more selected monitoring sensed signals of the monitoring sensed signals 118 that are monitored during the monitoring stage, one or more derivations of the respective monitoring sensed signal. For each of the selected monitoring sensed signals, the derivations that are performed on the respective selected monitoring sensed signal are the derivations that are performed on a respective learning sensed signal of the learning sensed signals 118 that corresponds to the respective selected monitoring sensed signal (the respective learning sensed signal and the respective selected monitoring sensed signal correspond if they are both based on sensor data of the same ICS parameter), e.g., based on an output of the derivations selection module 138.

Anomaly detection system 100 can be configured, e.g., using model compliance module 160, to automatically determine a conformance of the monitoring ICS signals with the behavioral model, as detailed further herein, inter alia with reference to FIG. 4. Upon determining a nonconformance of the monitoring ICS signals with the behavioral model, anomaly detection system 100 can be configured, e.g., using anomaly detection module 165, to automatically detect an anomalous behavior of the ICS 105, as detailed further herein, inter alia with reference to FIG. 4.

In some cases, anomaly detection system 100 can be configured, e.g., using behavioral model building/updating module 115, to automatically update the behavioral model, upon a repeated nonconformance of one or more of the monitoring ICS signals with the behavioral model, as detailed further herein, inter alia with reference to FIG. 4.

Attention is now drawn to FIG. 2, a block diagram schematically illustrating one example of an anomaly detection system 100, in accordance with the presently disclosed subject matter.

In accordance with the presently disclosed subject matter, anomaly detection system 100 comprises a network interface 210 that is configured to connect the anomaly detection system 100 to a communications network, through which the anomaly detection system 100 can connect to other computerized devices, including, inter alia, industrial controllers (e.g., 150-a, 150-b). The network interface 210 can be configured to enable the anomaly detection system 100 to send data and receive data sent thereto through the communications network.

Anomaly detection system 100 also comprises, or is otherwise associated with, a data repository 220 (e.g. a database, a storage system, a memory including Read Only Memory—ROM, Random Access Memory—RAM, or any other type of memory, etc.) configured to store data, including, inter alia, the behavioral model 225. Data repository 220 can be further configured to enable retrieval and/or updating and/or deletion of the stored data. It is to be noted that in some cases, data repository 220 can be distributed, while the anomaly detection system 100 has access to the information stored thereon, e.g., via a wired or wireless network to which anomaly detection system 100 is able to connect (utilizing its network interface 210).

Anomaly detection system 100 also comprises a processing circuitry 230. Processing circuitry 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant anomaly detection system 100 resources and for enabling operations related to anomaly detection system 100 resources.

Processing circuitry 230 can be configured to include a sensed signals reception module 240. Processing circuitry 230 can be configured, e.g., using sensed signals reception module 240, to receive monitoring sensed signals 118, formed from sensor data of ICS parameters that are sensed during the monitoring stage, as detailed earlier herein, inter alia with reference to FIG. 1. In some cases in which the anomaly detection system 100 builds the behavioral model 225, processing circuitry 230 can be configured, e.g., using sensed signals reception module 240, to receive learning sensed signals 118, formed from sensor data of ICS parameters that are sensed during the learning stage, as detailed earlier herein, inter alia with reference to FIG. 1.

Processing circuitry 230 can be configured to include a monitoring module 130, as detailed earlier herein, inter alia with reference to FIG. 1. Moreover, in some cases in which the anomaly detection system 100 builds the behavioral model 225, processing circuitry 230 can be further configured to include a learning module 110, as detailed earlier herein, inter alia with reference to FIG. 1.

Attention is now drawn to FIG. 3, a flowchart illustrating one example of a sequence of operations 300 for building a behavioral model 225, in accordance with the presently disclosed subject matter.

In accordance with the presently disclosed subject matter, anomaly detection system 100 can be configured, e.g. using sensed signals reception module 240, to receive, during a learning stage, learning sensed signals 118 of ICS parameters, the ICS parameters being parameters that are associated with an operation of the ICS 105. The learning sensed signals 118 are formed from sensor data of the ICS parameters that is sensed, during the learning stage, by sensors (e.g., 140-a, 140-b, . . . , 140-m, 140-n, 140-o, . . . , 140-z) that are associated with the ICS 105 (block 304). Some or all of the sensors (e.g., 140-a, 140-b, . . . , 140-m, 140-n, 140-o, . . . , 140-z) that are associated with the ICS 105 are connected to the ICS 105. In some cases, one or more of the sensors that are associated with the ICS 105 are external to the ICS 105, yet affect an operation of the ICS 105.

The ICS parameters can include, for example, one or more of: fixed parameters, enumerable parameters, or continuous parameters (e.g., temperature, pressure, water flow, electrical current, gas concentration, etc.).

Each fixed parameter has a plurality of possible fixed values, being possible statuses of the respective fixed parameter. An example of a fixed parameter is an operating status of a heating boiler. For example, an operating status of a heating boiler can be one of three possible statuses: operating (e.g., ON), not operating (e.g., OFF), or indeterminable (e.g., ERROR). An additional example of a fixed parameter is an operating status of a fan control system for controlling a rotation of a fan in a cooling system. For example, an operating status of a fan control system can be one of four possible statuses: 0 (OFF), 1 (LOW), 2 (MEDIUM) or 3 (HIGH).

Each enumerable parameter has a plurality of possible categorical parameter values, being possible statuses of the respective enumerable parameter. Each categorical parameter value of the possible categorical parameter values is associated with a respective cluster of sensed values. An example of an enumerable parameter is a speed level of a fan that varies in accordance with a status of a fan control system (e.g., 0 (OFF), 1 (LOW), 2 (MEDIUM) and 3) (HIGH). The different speed levels are the possible categorical parameter values, wherein each speed level is associated with a range of speeds of the fan (i.e., a respective cluster of speed values). For example, the fan can revolve at a speed between 0-100 revolutions per minute (RPM), 900-1100 RPM, 1900-2200 RPM and 2800-3300 RPM only, in dependence on the status of the fan control system.

In some cases, anomaly detection system 100 can be configured, e.g., using a derivations selection module 138, to process the learning sensed signals 118 to automatically select derivations (e.g., the most informative derivations) that are to be performed on the learning sensed signals 118 (block 308). Examples of derivations that can be performed on the learning sensed signals 118 are provided earlier herein, inter alia with reference to FIG. 1.

In some cases, anomaly detection system 100 can be configured, e.g., using a derivations producing module 134, to produce one or more learning derived signals 122 by calculating, for one or more of the learning sensed signals 118, one or more derivations on the respective learning sensed signal (block 312). In some cases, the same one or more derivations can be calculated for each of the learning sensed signals 118. Alternatively, in some cases, anomaly detection system 100 can be configured to process the learning sensed signals 118 to automatically select the derivations that are to be performed on the learning sensed signals 118, e.g., using derivation selection module 138, as noted above. By automatically selecting the derivations that are to be performed on the learning sensed signals 118 prior to performing the derivations, the number of derivations that are performed can be reduced. In this manner, anomaly detection system can operate using fewer processing resources. This is important, since Industrial Control Systems often include a large number of sensors (for example, a regional water management system may have two million sensors connected thereto), and, as such, it may be prohibitive, from a processing resources standpoint, to perform derivations that do not provide sufficient added information value.

In some cases, anomaly detection system 100 can be configured, e.g., using behavioral model building/updating module 115, to automatically learn one or more statistical behaviors, if any, of some or all learning ICS signals, wherein the learning ICS signals 134 include the learning sensed signals 118 and the learning derived signals 122, if any (block 316).

Moreover, anomaly detection system 100 can be configured, based on the learned statistical behaviors, to form one or more behavior-based groups of signals, e.g., using behavioral model building/updating module 115, wherein each group of the behavior-based groups includes respective learning ICS signals of the learning ICS signals that exhibit a common statistical behavior (block 320). In some cases, the common statistical behavior is different for at least two of the behavior-based groups.

Exemplary statistical behaviors of learning ICS signals include, but are not limited to, ICS signals that are constant over time, ICS signals that trend upwards and/or downwards over time in a statistically significant manner, ICS signals that vary over time with a statistically-significant periodicity, ICS signals having values that fit a normal distribution, etc. An example of a learning ICS signal that varies over time with a statistically-significant periodicity is an ambient (outside) temperature over the course of a calendar year in regions that exhibit seasonal changes in temperature during the course of the calendar year.

In some cases, a respective learning ICS signal of the learning ICS signals can be associated with two or more statistical behaviors. For example, a learning ICS signal may represent an electricity consumption of a device within the ICS 105 over a multi-year period, wherein the electricity consumption increases from year-to-year, and varies periodically over the course of each calendar year. This learning ICS signal is associated with two statistical behaviors, namely an upward trend over a multi-year period and a periodicity over the course of each calendar year.

In some cases, anomaly detection system 100 can be configured, e.g., using behavioral model building/updating module 115, to automatically learn sets of interdependent signals from among some or all of the learning ICS signals, the interdependent signals in each set of the sets including at least one independent signal and one or more dependent signals dependent (for example, statistically dependent) on the independent signal in accordance with a given type of dependency (block 324).

Anomaly detection system 100 can be configured, e.g., using behavioral model building/updating module 115, to form one or more interdependency-based groups of learned sets of interdependent signals, based on a type of dependency, in some or all of the learned sets, of the one or more dependent signals on the at least one independent signal, wherein each group of the interdependency-based groups includes given learned sets of the learned sets that exhibit a common type of dependency of the one or more dependent signals on the at least one independent signal (block 328).

Examples of types of dependencies include, but are not limited to, a linear correlation of the one or more dependent signals in a respective learned set with the at least one independent signal in the respective learned set, a non-linear correlation of the one or more dependent signals in a respective learned set with the at least one independent signal in the respective learned set, a status correlation between a status of an independent signal in a respective learned set of interdependent signals and a reading of a dependent signal in the respective learned set, etc.

An example of a linear correlation is as follows: a level of a water pool in a water management system may, until the water pool is filled, be in a linear correlation with a time of work of a water pump that fills the water pool (i.e., how much time has passed since the water pump has begun to work to fill the water pool).

Another example of a linear correlation is as follows: a temperature of a cooling agent for an oil-cooled electrical transformer may be linearly correlated, at any given time, with an average load of the electrical transformer over a period of time (e.g., 30 minutes or an hour) preceding the given time. It is to be noted that, in this example, the temperature of the cooling agent is a sensed signal 118, whereas the average load of the electrical transformer over the period of time is a derived signal 122, derived from multiple sensed signals 118 (i.e., multiple readings of the load of the electrical transformer).

An additional example of a linear correlation is as follows: a fuel consumption of an internal combustion engine (ICE) over any given period of time may be linearly correlated with a rate of a decrease in a level of a fuel tank that supplies fuel to the ICE over the given period of time. It is to be noted that, in this example, the fuel consumption is a sensed signal 118, whereas the rate of the decrease in the level of the fuel tank is a derived signal 122 (i.e., a first derivative of a learned signal 118 of the level of the fuel tank over at least the given period of time).

An example of a non-linear correlation is as follows: a power consumption of an alternating current (AC) electrical motor may be correlated non-linearly with a velocity of the electrical motor. Another example of a non-linear correlation is as follows: a non-linear correlation of a temperature of an AC electrical motor with a rotational speed (e.g., revolutions-per-minute) of the motor.

An example of a status correlation is as follows: a fan control system for controlling a fan may have one of four possible statuses at any given time: 0 (OFF), 1 (LOW), 2 (MEDIUM) or 3 (HIGH), wherein a current status of the fan control system is read by a sensor. Each of the possible statuses of the fan control system is correlated with a fan rotation speed that is sensed by a different sensor, such that there is a status correlation between a status of the fan control system and the fan rotation speed of the fan control system. For example, for a fan control system having a status 0, the fan rotation speed may be between 0 and 100 revolutions-per-minute (RPM); for a fan control system having a status 1, the fan rotation speed may be between 900 and 1100 RPM; for a fan control system having a status 2, the fan rotation speed may be between 1900 and 2200 RPM; and for a fan control system having a status 3, the fan rotation speed may be between 2800 and 3300 RPM.

In some cases, the behavioral model 225 includes the one or more behavior-based groups of signals. Additionally, or alternatively, in some cases, the behavioral model 225 includes the one or more interdependency-based groups of learned sets of interdependent signals.

Attention is now drawn to FIG. 4, a flowchart illustrating one example of a sequence of operations 400 for automatically detecting anomalies in an ICS 105, in accordance with the presently disclosed subject matter.

In accordance with the presently disclosed subject matter, anomaly detection system 100 can be configured to provide the behavioral model 225. The behavioral model 225 can be built by anomaly detection system 100 or by an external computing entity, external to the anomaly detection system 100. One example of a sequence of operations for building the behavioral model 225 is detailed earlier herein, inter alia with reference to FIG. 3. In some cases, the behavioral model 225 comprises one or more behavior-based groups of learning ICS signals, each group of the behavior-based groups including respective learning ICS signals of the learning ICS signals that exhibit a common statistical behavior, as detailed earlier herein, inter alia with reference to FIG. 3. Additionally, or alternatively, in some cases, the behavioral model 225 comprises one or more interdependency-based groups of learned sets of interdependent learning ICS signals, each learned set of the learned sets in a given group of the interdependency-based groups including at least one independent signal and one or more dependent signals that depend on the at least one independent signal in accordance with a given type of dependency that is common to each of the learned sets in the given group (block 404). In some cases, the common statistical behavior is different for at least two of the behavior-based groups. Additionally, or alternatively, in some cases, the given type of dependency is different for at least two of the interdependency-based groups.

Anomaly detection system 100 can be configured to receive, during a monitoring stage, monitoring sensed signals 118 of ICS parameters, e.g., using sensed signals reception module 240, the monitoring sensed signals 118 being formed from sensor data of the ICS parameters. The sensor data is sensed, during the monitoring stage, by sensors (e.g., 140-a, 140-b, . . . , 140-m, 140-n, 140-o, . . . , 140-z) that are associated with the ICS 105 (block 408). At least some of the monitoring sensed signals 118 are sensed by sensors (e.g., 140-a, 140-b, . . . , 140-m, 140-n, 140-o, . . . , 140-z) that are connected to the ICS 105. In some cases, at least some of the monitoring sensed signals can be sensed by sensors that are external to (not connected to) the ICS 105.

In some cases, anomaly detection system 100 can be configured to produce, e.g., by derivations producing module 134, one or more monitoring derived signals. The monitoring derived signals are produced by calculating, for one or more selected monitoring sensed signals of the monitoring sensed signals 118 that are monitored during the monitoring stage, one or more derivations of the respective monitoring sensed signal (block 412). For each of the selected monitoring sensed signals, the derivations that are performed on the respective selected monitoring sensed signal are the derivations that are performed on a respective learning sensed signal of the learning sensed signals 118 that corresponds to the respective selected monitoring sensed signal (the respective learning sensed signal and the respective selected monitoring sensed signal correspond if they are both based on sensor data of the same ICS parameter). In some cases, the derivations that are performed on each of the selected monitoring sensed signals are selected based on an output of the derivation selection module 138.

Anomaly detection system 100 can be configured, e.g., using model compliance module 160, to automatically monitor a conformance of monitoring ICS signals, being the monitoring sensed signals and the monitoring derived signals, if any, with the behavioral model (block 416). For a given monitoring ICS signal of the monitoring ICS signals that corresponds to a given learning ICS signal in a behavior-based group of the behavioral model 225, the given monitoring ICS signal is monitored to determine if its observed statistical behavior is as predicted based on the behavioral model 225, e.g., using a mathematical approach known as metrics in functional spaces. For example, based on a distance between an observed statistical behavior of the given monitoring ICS signal and the predicted statistical behavior of the given monitoring ICS signal based on the behavioral model 225, the given monitoring ICS signal can be provided with a grade that indicates a conformance between the observed statistical behavior of the given monitoring ICS signal and its predicted statistical behavior. If the grade is indicative of an unacceptable discrepancy between the observed statistical behavior of the given monitoring ICS signal and its predicted statistical behavior (e.g., the grade is less than a threshold value), an anomaly can be automatically detected. Likewise, for a given set of monitoring ICS signals that correspond to a given learned set of interdependent learning ICS signals in one of the interdependency-based groups of the behavioral model 225, the given set of monitoring ICS signals is monitored to determine if the observed interdependency of the given set of monitoring ICS signals is as predicted based on the behavioral model 225, e.g., using a mathematical approach known as metrics in functional spaces. For example, based on a distance between an observed interdependency of the given set of monitoring ICS signals and a predicted interdependency of the given set of monitoring ICS signals, the given set of monitoring ICS signals can be provided with a grade that indicates a conformance of the observed interdependency of the given set with the predicted interdependency of the given set. If the grade is indicative of an unacceptable discrepancy between the observed interdependency of the given set and the predicted interdependency of the given set (e.g., the grade is less than a threshold value), an anomaly can be automatically detected.

Upon determining a nonconformance (i.e., an unacceptable discrepancy) of at least one of: (a) one of the monitoring ICS signals with the behavioral model (i.e., a nonconformance of one of the monitoring ICS signals with its corresponding given learning ICS signal in a behavior-based group of the behavioral model 225) or (b) a set of monitoring ICS signals with the behavioral model 225 (i.e., a nonconformance of the set of monitoring ICS signals with its corresponding given learned set of interdependent learning ICS signals in one of the interdependency-based groups of the behavioral model 225), anomaly detection system 100 can be configured, e.g., using anomaly detection module 165, to automatically detect an anomaly (block 420).

To illustrate how the anomaly detection system 100 determines the conformance of an individual monitoring ICS signal with the behavior-based groups in the behavioral model 225, assume that the monitoring ICS signal is sensed power consumption of a given electrical motor. Moreover, assume that a learning ICS signal of the power consumption of the given electrical motor indicates a year-to-year growth trend in the power consumption of the given electrical motor. If the monitoring ICS signal indicates a decrease or a stagnation in the power consumption of the given electrical motor over two consecutive calendar years, anomaly detection system 100 can be configured to detect an anomaly in the statistical behavior of the monitoring ICS signal. If this decrease or stagnation in the power consumption of the given electrical motor continues over a time period of several years, the behavioral model 225 may be modified to no longer indicate that the power consumption of the given electrical motor exhibits a year-to-year growth trend.

It is to be noted that a learning ICS signal can be included in a plurality of behavior-based groups. In some cases, the plurality of behavior-based groups can even include behavior-based groups that are associated with different statistical behaviors. Returning to the example in which the learning ICS signal is indicative of a sensed power consumption of a given electrical motor, the learning ICS signal may indicate, in addition to a year-to-year growth trend in the power consumption of the given electrical motor, a periodicity of the power consumption over each calendar year (e.g., higher power consumption during the summer and the winter than during the spring and the fall). Accordingly, if the monitoring ICS signal of the power consumption of the given electrical motor does not vary periodically over a calendar year, anomaly detection system 100 can be configured to detect an anomaly. If the monitoring ICS signal of the power consumption of the given electrical motor does not vary periodically over the calendar year for a number of calendar years, the behavioral model 225 may be modified to no longer indicate that the power consumption of the given electrical motor varies periodically over each calendar year.

Another example of a monitoring ICS signal can be an ambient (i.e., outside) temperature. If the behavioral model is formed based on a learning ICS signal of the ambient temperature that is indicative of the ambient temperature only during the months May, June and July, the behavioral model may include the learning ICS signal in a behavior-based group that includes learning signals that exhibit statistically significant growth trends (since the ambient temperature generally rises between the beginning of May and the end of July). When the ambient temperature is monitored, during a monitoring stage, it may be observed that the ambient temperature changes with an annual periodicity and does not continue to increase all of the time. In this example, the behavioral model 225 may be modified to include the learning ICS signal of the ambient temperature (which is the monitoring ICS signal) in a behavior-based group that includes learning ICS signals having a periodicity (e.g., an annual periodicity).

That is, upon repeatedly determining a nonconformance of at least one monitoring ICS signal of a given parameter of the ICS parameters with the common statistical behavior associated with a given group of the behavior-based groups that includes one or more corresponding learning ICS signals of the given ICS parameter, in accordance with a statistical behavior invalidity criterion, anomaly detection system 100 can be configured, e.g., using behavioral model building/updating module 115, to automatically update the behavioral model 225. In the above example of the ambient temperature over time, the behavioral model 225 may be updated to include the monitoring ICS signals of the ambient temperature in another group of the behavior-based groups that is associated with annual periodicity, and to remove the learning ICS signals from the given group of the behavior-based groups that includes learning ICS signals that exhibit statistically significant growth trends.

To illustrate how the anomaly detection system 100 determines the conformance of a set of monitoring ICS signals with the interdependency-based groups in the behavioral model 225, assume that a monitoring ICS signal in the set of monitoring ICS signals is indicative of a level of a given water pool over time. It is further to be assumed that, in accordance with a learned set of interdependent learning ICS signals in a given interdependency-based group, the level of the given water pool is expected to be linearly correlated with the time of work of a water pump that fills the given water pool. If the monitoring ICS signal of the level of the given water pool does not exhibit a linear correlation with the time of work of the water pump that fills the given water pool over a given period of time, anomaly detection system 100 can be configured, e.g., using anomaly detection module 165, to detect an anomaly. If the level of the given water pool continues to not exhibit a linear correlation with the time of work of the water pump, anomaly detection system 100 can be configured, e.g., using behavioral model building/updating module 115, to automatically update the behavioral model 225 in accordance therewith.

As a further illustration of how the anomaly detection system 100 determines a lack of conformance of an individual monitoring ICS signal with a given interdependency-based group in the behavioral model 225, assume that a learned set of interdependent learning ICS signals in the given interdependency-based group is indicative of a status correlation between a status of a fan management system for controlling a fan and fan speeds of the fan. During the learning stage in which the behavioral model 225 is built, the load on the fan management system may be small. As a result, during the learning stage, the fan management system may cool, by means of the fan, using status 0 and status 1 of the fan management system, wherein status 0 corresponds, for example, to a fan rotation speed between 0 revolutions-per-minute (RPM) and 100 RPM, and wherein status 1 corresponds, for example, to a fan rotation speed between 900 RPM and 1100 RPM. In this case, the learned set of interdependent learning ICS signals in the given interdependency-based group may indicate that there is a status correlation between statuses 0 and 1 of the fan management system and corresponding fan rotation speeds.

During the monitoring stage, the load on the fan management system may increase, such that the fan rotation speed needs to be greater than 1100 RPM at certain time instances. The fan management system during the monitoring stage may have a status 2, which corresponds to a fan rotation speed between 1900 RPM and 2200 RPM, and a status 3, which corresponds to a fan rotation speed between 2800 RPM and 3300 RPM. Since statuses 2 and 3 of the fan management system were never applied during the learning stage, these statuses and their corresponding fan rotation speeds are not included in the learned set of interdependent learning ICS signals that is directed to the status correlation between the status of the fan management system and the fan rotation speed. In such a case, the learned set can be updated to include interdependent learning ICS signals that exhibit the status correlation between the statuses 2 and 3 of the fan management system and their corresponding fan rotation speeds (wherein the interdependent learning ICS signals are based on the monitoring ICS signals of the statuses of the fan management system and the fan rotation speeds).

Upon repeatedly determining a nonconformance of a set of monitoring ICS signals with a corresponding learned set of interdependent learning ICS signals, in accordance with an interdependency invalidity criterion, anomaly detection system 100 can be configured, e.g., using behavioral model building/updating module 115, to automatically update the behavioral model 225.

It is to be noted that, with reference to FIGS. 3 and 4, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for automatically detecting anomalies in an industrial control system (ICS), the system comprising a processing circuitry configured to:

provide a behavioral model comprising interdependency-based groups of learned sets of interdependent ICS signals of parameters associated with an operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group, the given type being different for at least two of the interdependency-based groups;

obtain monitoring ICS signals of given parameters of the parameters, the monitoring ICS signals corresponding to a given learned set of the learned sets in a given interdependency-based group of the interdependency-based groups;

monitor a conformance of an observed interdependency of the monitoring ICS signals with a predicted interdependency of the monitoring ICS signals, the predicted interdependency being in accordance with the given type of dependency associated with the given learned set; and upon determining a nonconformance of the observed interdependency with the predicted interdependency, automatically detect an anomaly.

2. The system of claim 1, wherein at least one of the monitoring ICS signals is sensed by a sensor in the ICS.

3. The system of claim 1, wherein at least one of the monitoring ICS signals is derived from a monitoring sensed signal that is sensed by a sensor in the ICS.

4. The system of claim 1, wherein, upon a repeated nonconformance of the observed interdependency with the predicted interdependency, in accordance with an interdependency invalidity criterion, the processing circuitry is further configured to:

automatically update the behavioral model.

5. The system of claim 1, wherein the behavioral model further comprises one or more behavior-based groups of respective ICS signals of the parameters that are associated with the operation of the ICS, wherein, for each of the behavior-based groups, the respective ICS signals in the respective behavior-based group exhibit a common statistical behavior; and wherein the processing circuitry is further configured to:

obtain a second monitoring ICS signal corresponding to a respective ICS signal of the respective ICS signals in a given behavior-based group of the behavior-based groups;

monitor a conformance of an observed statistical behavior of the second monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detect a second anomaly.

6. The system of claim 5, wherein the second monitoring ICS signal is sensed by a sensor in the ICS.

7. The system of claim 5, wherein the second monitoring ICS signal is derived from a monitoring sensed signal that is sensed by a sensor in the ICS.

8. The system of claim 5, wherein, upon a repeated nonconformance of the observed statistical behavior with the predicted statistical behavior, in accordance with a statistical behavior invalidity criterion, the processing circuitry is further configured to:

automatically update the behavioral model.

9. A method for automatically detecting anomalies in an industrial control system (ICS), the method being performed by a processing circuitry, and comprising:

providing a behavioral model comprising interdependency-based groups of learned sets of interdependent ICS signals of parameters associated with an operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group, the given type being different for at least two of the interdependency-based groups;

obtaining monitoring ICS signals of given parameters of the parameters, the monitoring ICS signals corresponding to a given learned set of the learned sets in a given interdependency-based group of the interdependency-based groups;

monitoring a conformance of an observed interdependency of the monitoring ICS signals with a predicted interdependency of the monitoring ICS signals, the predicted interdependency being in accordance with the given type of dependency associated with the given learned set; and upon determining a nonconformance of the observed interdependency with the predicted interdependency, automatically detecting an anomaly.

10. The method of claim 9, wherein at least one of the monitoring ICS signals is sensed by a sensor in the ICS.

11. The method of claim 9, wherein at least one of the monitoring ICS signals is derived from a monitoring sensed signal that is sensed by a sensor in the ICS.

12. The method of claim 9, wherein, upon a repeated nonconformance of the observed interdependency with the predicted interdependency, in accordance with an interdependency invalidity criterion, the method further comprises:

automatically updating the behavioral model.

13. The method of claim 9, wherein the behavioral model further comprises one or more behavior-based groups of respective ICS signals of the parameters that are associated with the operation of the ICS, wherein, for each of the behavior-based groups, the respective ICS signals in the respective behavior-based group exhibit a common statistical behavior; and wherein the method further comprises:

obtaining a second monitoring ICS signal corresponding to a respective ICS signal of the respective ICS signals in a given behavior-based group of the behavior-based groups;

monitoring a conformance of an observed statistical behavior of the second monitoring ICS signal with a predicted statistical behavior of the respective ICS signal, the predicted statistical behavior being the common statistical behavior exhibited by the respective ICS signal; and upon determining a nonconformance of the observed statistical behavior with the predicted statistical behavior, automatically detecting a second anomaly.

14. The method of claim 13, wherein the second monitoring ICS signal is sensed by a sensor in the ICS.

15. The method of claim 13, wherein the second monitoring ICS signal is derived from a monitoring sensed signal that is sensed by a sensor in the ICS.

16. The method of claim 13, wherein, upon a repeated nonconformance of the observed statistical behavior with the predicted statistical behavior, in accordance with a statistical behavior invalidity criterion, the method further comprises:

automatically updating the behavioral model.

17. A non-transitory computer readable storage medium having computer readable program code embodied therewith, the computer readable program code, executable by a processing circuitry of a computer to perform a method for automatically detecting anomalies in an industrial control system (ICS), the method comprising:

providing a behavioral model comprising interdependency-based groups of learned sets of interdependent ICS signals of parameters associated with an operation of the ICS, wherein, for each of the interdependency-based groups, the learned sets of interdependent ICS signals in the respective interdependency-based group include at least one independent signal and one or more dependent signals that are dependent on the independent signal in accordance with a given type of dependency that is common to each of the learned sets in the respective interdependency-based group, the given type being different for at least two of the interdependency-based groups;

obtaining monitoring ICS signals of given parameters of the parameters, the monitoring ICS signals corresponding to a given learned set of the learned sets in a given interdependency-based group of the interdependency-based groups;

monitoring a conformance of an observed interdependency of the monitoring ICS signals with a predicted interdependency of the monitoring ICS signals, the predicted interdependency being in accordance with the given type of dependency associated with the given learned set; and upon determining a nonconformance of the observed interdependency with the predicted interdependency, automatically detecting an anomaly.

* * * * *